(No Model.)
G. W. THISSELL.
CODDLING MOTH TRAP AND TREE PROTECTOR.
No. 275,093.　　　　　　　　　Patented Apr. 3, 1883.
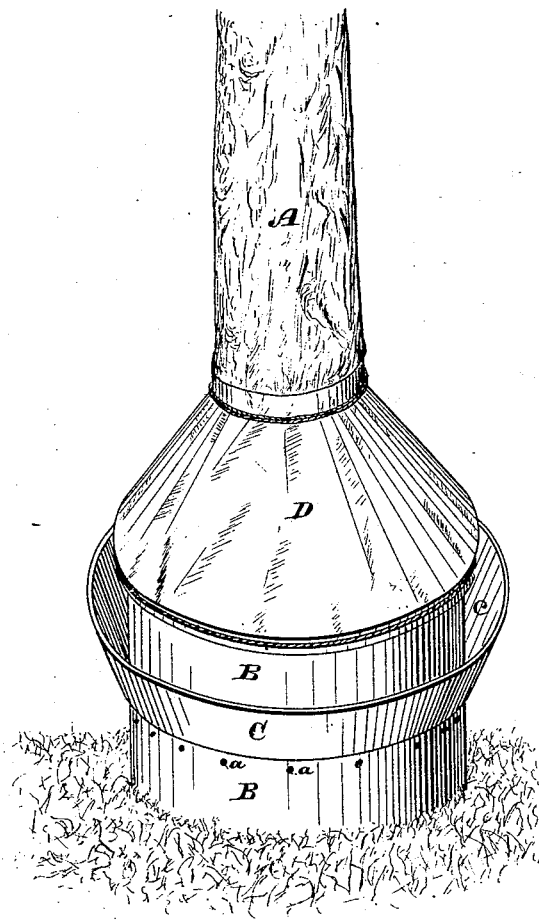
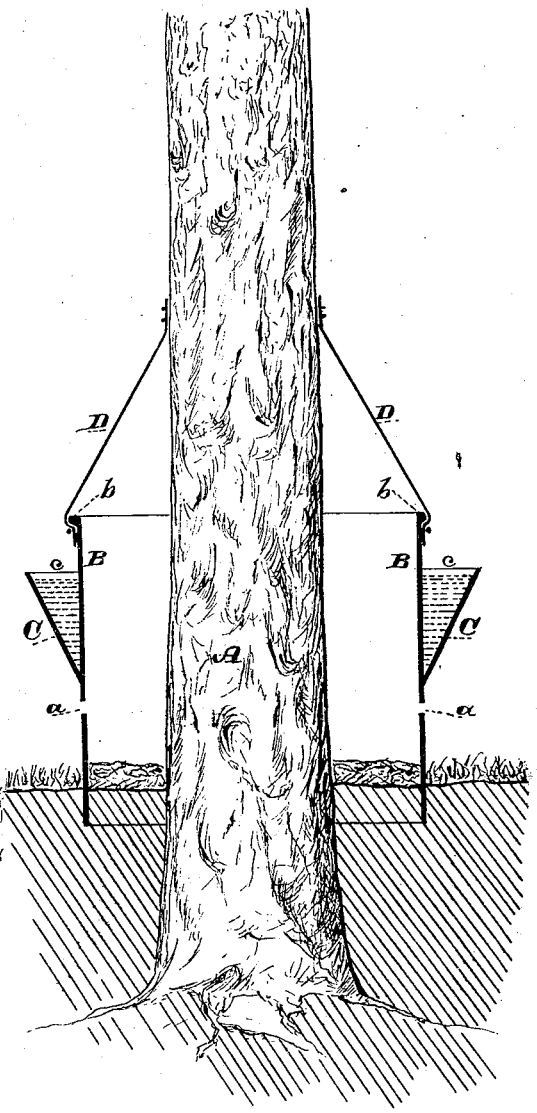
Witnesses,
Geo. H. Strong
J. H. Krause
Inventor
Geo W. Thissell
By
Dewey & Co.
Attorneys

UNITED STATES PATENT OFFICE.

GEORGE W. THISSELL, OF WINTERS, CALIFORNIA.

CODDLING-MOTH TRAP AND TREE-PROTECTOR.

SPECIFICATION forming part of Letters Patent No. 275,093, dated April 3, 1883.

Application filed December 11, 1882. (No model.)

*To all whom it may concern:*

Be it known that I, GEORGE W. THISSELL, of Winters, county of Yolo, State of California, have invented an Improved Coddling-Moth Trap and Tree-Protector; and I hereby declare the following to be a full, clear, and exact description thereof.

My invention relates to a new and useful insect-trap, the special effect of which is to protect trees, shrubbery, &c., from the ravages of such insects as the coddling-moth and other *Lepidoptera*, which are so injurious to the fruit of apple, pear, and other trees. The most common form of these pests is what is known as the "coddling-moth," and its ravages are directed to various fruit-trees and shrubs, but more especially to the apple and pear. The manner of its attack is this: When in a perfect form or moth it stings the fruit and lays its eggs therein. These eggs in due time hatch into the larvæ or caterpillars, which destroy the fruit, and, eating their way out, drop upon the ground. Through instinct these larvæ at once make for the tree, and, knowing when it is reached, find a rough place in the bark and there lie hid. In these places they weave their cocoons, in which they lie in their chrysalis state as pupæ. Finally, developing into the perfect insect or moth, they fly off to other fruit, and the operation is repeated.

The object of my invention is to entrap the larvæ in their hiding-places on the trunk of the tree, so that when finally developed into the moth they are imprisoned and cannot fly off, but will die in the trap.

To this end my invention consists in an annular rim having a circumscribing basin, trough, or moat for the reception of some suitable substance which the insect cannot cross or span. A series of holes are punched through the main rim below the trough, and a cover or hood, of some suitable fabric, is secured around the upper edge of the main rim, as will hereinafter be fully explained.

Reference being made to the accompanying drawings, Figure 1 is a perspective view. Fig. 2 is a vertical section of the trap as applied to a tree.

Let A represent the base of a trunk of a tree.

B is a wide or high rim of larger diameter than the tree which it circumscribes, its lower edge being driven into the ground, so that the larvæ cannot find an entrance underneath. About half-way up the rim B is secured (as by soldering) a band, C, by its lower edge. This band is secured in an inclined position with regard to the main rim, so that it forms between itself and the main rim a trough, basin, or moat, c, which I fill with some suitable substance or liquid, oil being preferable. This trough, at the surface of the oil, should be wider than the larva or caterpillar is long, so that by no possibility shall he be able to span or cross it. The trough may be made in any other suitable manner or shape, its object being simply to prevent the insects from crawling up the outside of the trap. I have shown this particular shape of trough because it seems simple and easily made. The rim B, which forms the inner wall of the basin or trough, extends higher than the band C, and has around its upper edge a small flange, b. Around this flange and to it is suitably tied the base of a piece of cloth, D, or other such fabric. The cloth is carried up a short distance, and its upper edge is securely tied to the trunk of the tree, thus forming a sort of hood or tent around the tree, and through which its trunk extends, like the center pole of a tent. All around the main rim B, below the band C and above the ground, are made holes *a* in any number. These are made large enough to admit the larvæ; but are too small to allow the moth to come out. It is obvious that instead of the holes *a*, I could cover a slot or opening in the band with wire-netting of suitable mesh; but I deem the holes simpler and better; or I could construct the whole rim B below the band C of suitable wire-netting.

The trap being thus fixed in position, and the trough filled with oil, its operation is as follows: The larvæ, making for the tree, come to the rim B, and, not being able to get under it, crawl up its sides. If any should miss the holes *a*, or refuse at first to enter, they crawl on up the side of the flaring band C until they reach the oil trough or moat *c*. This they cannot span, as it is too wide and is full of oil, and farther progress in that direction is stopped. The holes *a* afford them a passage to the tree, and, passing in, they get to the tree within the trap. In search of a hiding-place they crawl up the tree, but are soon stopped by the hood or cloth D, where it is tied around the trunk. I prefer to place inside the trap, around the base of the tree, cotton or old rags, as inducement to secrete themselves therein. They find accessible places within the trap, spin their cocoons, and in due course of time pass through the chrysalis state and develop into moths. As larvæ, they do not wish to leave the trap; but as moths they cannot escape, as above they are confined by the cloth and below by the ground, while the holes through which they entered as larvæ are now too small to permit their egress. They therefore soon perish, and without laying any eggs, as they will only lay them in the fruit. Thus the insects are entrapped, the species is reduced, and the tree protected.

The trap is placed in position in the spring, and remains during the season. The imprisoned moths die in about four days after emerging from the chrysalis state, and every larva which reaches the tree is destroyed, thus materially decreasing the species.

Having thus described my invention, what I claim as new, and desire to secure by Letters Patent, is—

The rim B, formed to surround the base of a tree or shrub, having a series of perforations or holes, $a$, large enough to permit the insect in its larval state to enter, but too small to permit the escape of the moth, in combination with a circumscribing basin, trough, or moat upon the rim, and a cover or hood secured around the top of the rim B and around the trunk of the tree or shrub, substantially as herein described.

In witness whereof I hereunto set my hand.

GEORGE W. THISSELL.

Witnesses:
R. MOGENSTER,
C. H. PERKINS.